United States Patent [19]

Peters et al.

[11] 4,150,660
[45] Apr. 24, 1979

[54] EASY ACCESS ENERGY CONVERSION PANELS FOR SOLAR HEATING SYSTEMS

[75] Inventors: Melville F. Peters, Livingston, N.J.; Walter T. Peters, East Dennis, Mass.

[73] Assignees: Margot Elizabeth Peters, East Dennis, Mass.; Albert F. Kronman, Locust Valley, N.Y.

[21] Appl. No.: 833,464

[22] Filed: Sep. 15, 1977

[51] Int. Cl.² ................................................. F24J 3/02
[52] U.S. Cl. ..................................... 126/270; 237/1 A
[58] Field of Search ............... 126/270, 271; 237/1 A; 49/477; 165/18, 48

[56] References Cited

U.S. PATENT DOCUMENTS

| | | | |
|---|---|---|---|
| 2,559,869 | 7/1951 | Gay | 237/1 A |
| 2,680,565 | 6/1954 | Löf | 126/271 X |
| 3,371,986 | 3/1968 | Brown | 49/477 X |
| 3,412,728 | 11/1968 | Thomason | 126/270 |
| 3,980,071 | 9/1976 | Barber, Jr. | 237/1 A |
| 4,029,080 | 6/1977 | Warren | 126/270 |
| 4,066,118 | 1/1978 | Goettl | 126/270 |
| 4,073,283 | 2/1972 | Löf | 237/1 A |
| 4,074,705 | 2/1978 | Robinson, Jr. et al. | 237/1 A |
| 4,108,155 | 8/1978 | Koizumi et al. | 126/270 |

Primary Examiner—Albert W. Davis, Jr.
Assistant Examiner—Larry Jones
Attorney, Agent, or Firm—Albert F. Kronman

[57] ABSTRACT

A series of panels for converting solar energy into heat for warming gas or liquid are incorporated between the rafters of a building. Access to each of the panels for easy installation or repair is possible from within the building by panel securing means carried by the rafters. The rafters are provided with openings which enable them to form part of the panel and the air or liquid distribution protion of the system.

8 Claims, 11 Drawing Figures

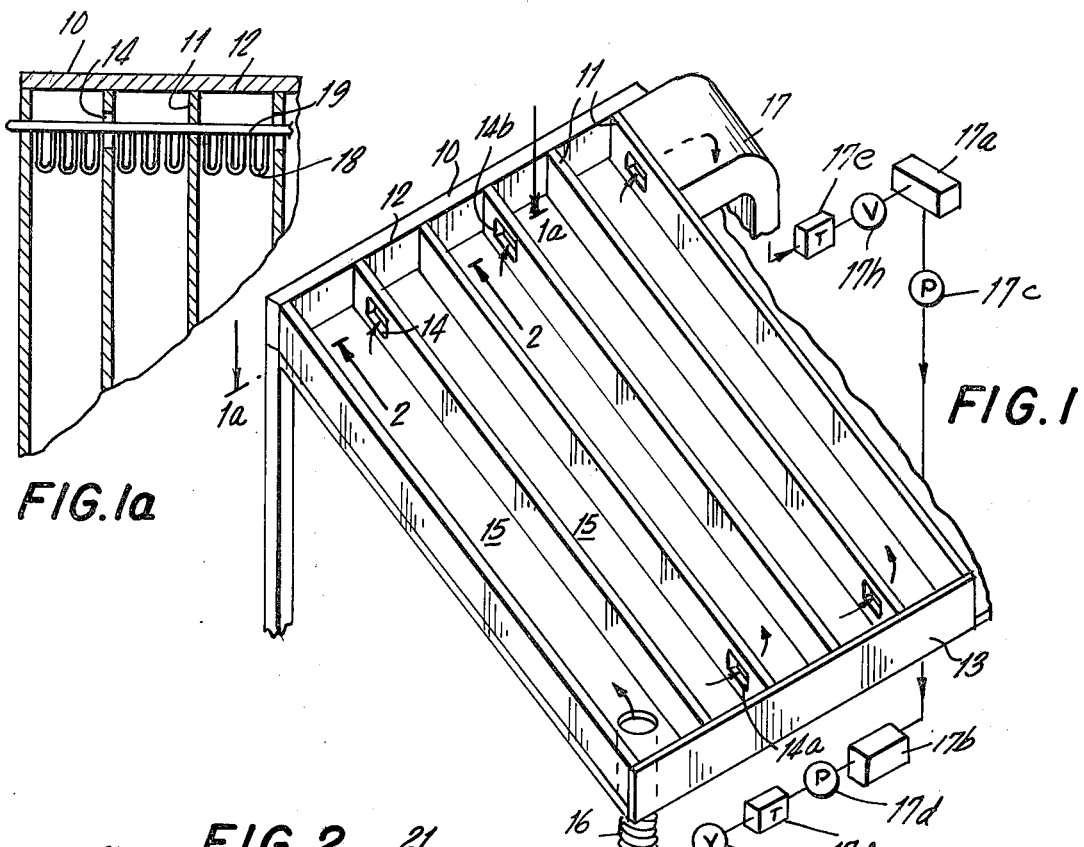
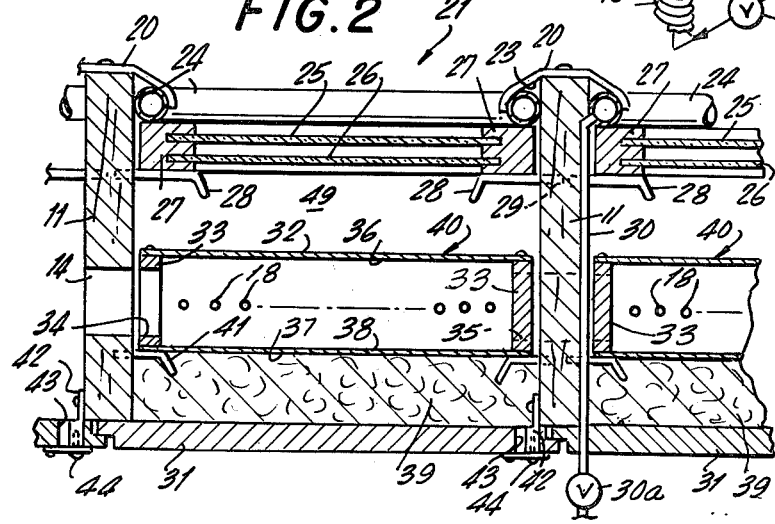
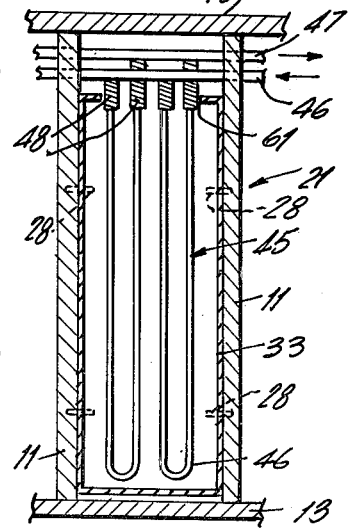
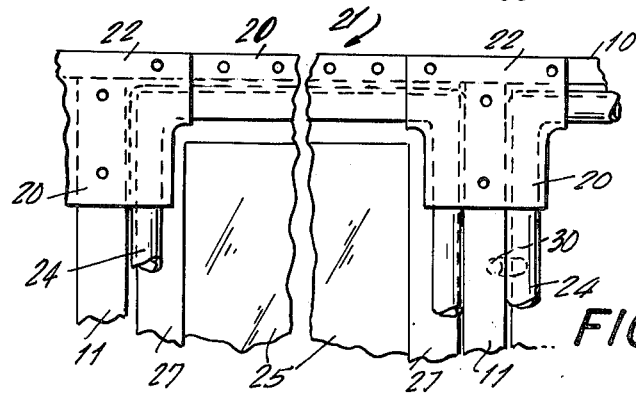
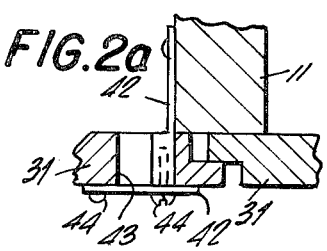

EASY ACCESS ENERGY CONVERSION PANELS FOR SOLAR HEATING SYSTEMS

BACKGROUND OF THE INVENTION

It is well known in the solar heating art to provide one or more panels to receive solar energy, absorb the radiant energy within the panels and transfer the absorbed energy in the form of heat to gas or liquid passing through the panels. The heated gas or liquid is then applied to a heat exchange storage unit or directly into an area to be heated. Such devices are disclosed in U.S. Pat. Nos. 2,202,756; 2,907,318; 3,250,269; 3,412,728; 3,893,506; and 3,987,784.

Devices such as are disclosed in the above patents are normally secured to the roofs of buildings or, if built into the roofs, are accessible for installation or repair only from the outside or roof of the building. The outer, light transmitting members which must be cleaned from time to time, can be reached only by means of ladders giving access to the roof surface. Where the panel array is extensive, even this activity requires great care and skill.

Where solar panels have been made accessible for easier installation or servicing it has been suggested to install them in the windows of buildings as shown in U.S. Pat. Nos. 3,981,445 and 3,990,635. Such devices, however, limit the amount of solar panel size and reduce the number of hours during which the panels will be in a position to receive solar energy.

Accordingly, it is an object of the present invention to provide a solar heating system for a roof in which the energy conversion panels are accessible from within the supporting building structure for both installation and repair.

Another object of the present invention is to provide an energy conversion panel in which the building rafters cooperate to support and interconnect the panels into an array.

Still another object of the present invention is to provide a solar energy conversion panel which can be installed and serviced by relatively inexperienced personnel.

A further object of the present invention is to provide a solar energy conversion panel which can be repaired or cleaned without disturbing the other panels in the system.

An object of the present invention is to provide an energy conversion panel which will lend itself both to liquid as well as gas heating uses.

SUMMARY OF THE INVENTION

A solar heating system made in accordance with the present invention consists of a series of solar energy absorbing panels each panel preferably installed between adjacent rafters of a roof structure. Openings in the rafters permit the passage of a gas, such as air, or liquid bearing lines from panel to panel to form an interconnected array. The gas or liquid is heated by the radiant energy in the well-known manner and is thereafter lead by fans and pumps into either a heat storage unit, a heat exchange unit or directly into an area to be heated. A return line or duct back to the panels completes the system.

Each of the panels consists of an elongated member received between adjacent rafters and having a top transparent sheet, an absorber beneath the transparent sheet to convert solar energy into thermal energy and an elongated chamber beneath the absorber for the passage of gas or liquid bearing lines therethrough.

In one embodiment, the panel elements are secured in place by clip members easily accessible from within the building. In another embodiment the panel elements are carried within a trough hingedly secured at one end to the rafters so that the panel may be swung downwardly within the building for easy access.

BRIEF DESCRIPTION OF THE DRAWINGS

In the accompanying drawings forming part hereof, similar elements have been given the same reference numerals, in which drawings;

FIG. 1 is a fragmentary, somewhat isometric view of a building roof rafter structure made in accordance with one embodiment of the present invention showing somewhat diagrammatically the fluid circulating system.

FIG. 1a is a sectional view taken on line 1a—1a in FIG. 1, looking in the direction of the arrows with the addition of liquid bearing lines.

FIG. 2 is a cross sectional view, on an enlarged scale of a complete panel assembly built into the structure of FIG. 1 forming one embodiment of the present invention.

FIG. 2a is a fragmentary detailed cross sectional view of the clip fastening assembly for the bottom plate shown in FIG. 2.

FIG. 3 is a top view of a panel assembly and liquid bearing lines, a further embodiment of the present invention.

FIG. 4 is a fragmentary top view of the panel assembly shown in FIG. 2.

DESCRIPTION OF THE PREFERRED EMBODIMENTS

Figure 5:
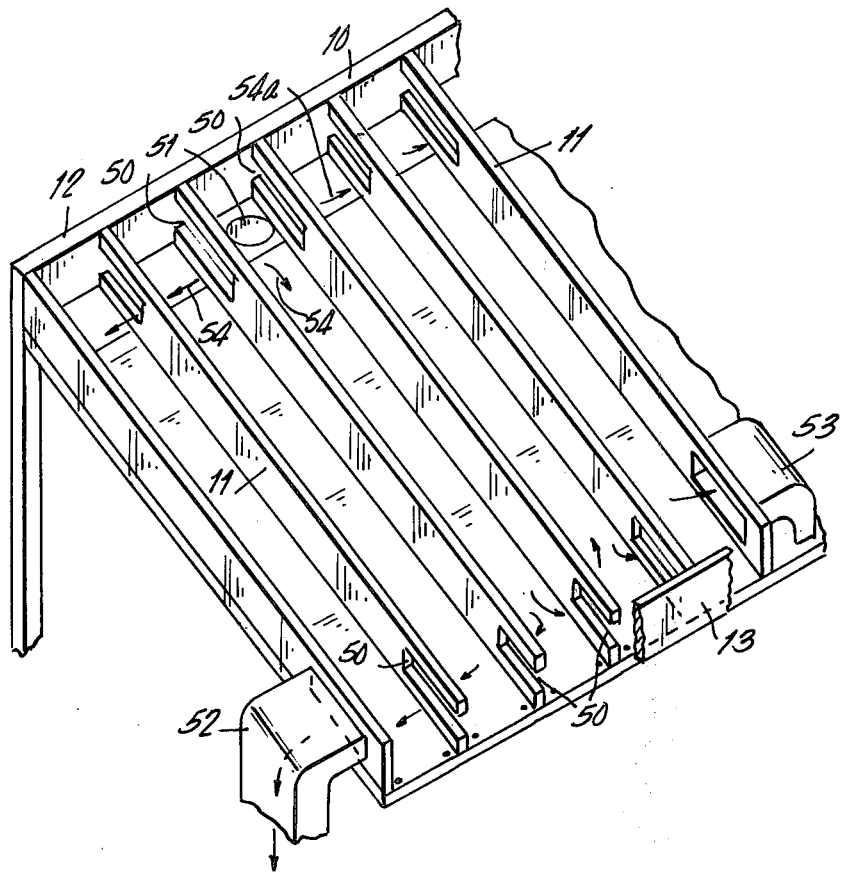
FIG. 5 is a view similar to FIG. 1 showing still another embodiment of the present invention.

Referring to the drawings and particularly to FIGS. 1, 1a, 2 and 4, there is shown a roof supporting structure 10, consisting of a plurality of parallel, spaced rafters 11 secured at their upper ends to a ridge beam 12 and at their lower ends to the fascia 13.

The rafters 11 are alternately provided with openings 14, 14a, 14b, etc. inwardly spaced from one end thereof, as best shown in FIG. 1. In this manner, the space between the rafters comprises a continuous channel 15 through which gas, such as air, may pass. The air enters the channel 15 from a return duct 16 and moves through each of the said spaces by way of the rafter openings 14, 14a, 14b, etc. until it reaches the outlet duct 17.

In accordance with well-known solar heating systems, the outlet duct 17 may be connected to a heat exchange unit 17a, a heat storage chamber 17b or directly discharge into an area to be heated. Fans or pumps 17c, 17d, may be used to circulate the heated gas or liquid. These elements being well-known and forming no part of the present invention have been illustrated diagrammatically.

Where it is desired to heat water or some other liquid by means of the present invention, liquid bearing lines such as copper tubing 18 having a heat absorbing surface and best shown in FIG. 1a are disposed within each of the channel spaces, passing through bores in the rafters (not shown) or connected to a header 19. In this event, thermostats 17e and 17f are incorporated into the fluid line 18 or the air duct 17 as shown in FIG. 1. If the temperature in the panel 21 or the fluid line reaches a minimum below which the liquid might freeze, valve 17h is opened and valve 17g is closed, whereupon the liquid will be drained out of the panel array into the storage chamber 17b. When the temperature in the panel 21 rises, valve 17g is opened and liquid is permitted to flow from the storage chamber 17b to the panel 21.

FIGS. 2 and 4 show the remaining elements which complete the panels 21 built into the roof supporting structure 10. These elements include elongated flanged strips 20, of metal, plastic or other fluid impervious material which are nailed or fastened to the tops of the rafters, ridge beam and fascia. "T" shaped flanged members 22 are secured at the corners, overlapping the strips 20, to form a frame-like member having a continous concavity 23 there under. The concavity 23 is of a size to receive a hollow inflatable elastomeric gasket 24 made of rubber, neoprene or some similar material which will withstand exposure to the elements. The gasket 24 prevents leakage of fluids into or out of the interior of the panel as hereinafter more fully explained.

Spaced infra-red light transmitting plates 25, 26 made of glass or plastic are edge supported by elongated resilient blocks 27 beneath the gasket 24. The width of the plates and blocks is such that they will be frictionally held between adjacent rafters during panel assembly or disassembly. Pins 28 receivable within bores 29 in the rafters 11 serve to releasably secure the blocks 27 in place.

Each of the gaskets 24 is provided with an elongated tube 30 in communication with the interior of the gasket. The tube 30 extends through a bottom plate 31 of the panel and terminates in a valve 30a whereby individual gaskets 24 may be inflated to provide fluid integrity to the roof or deflated for panel disassembly. The bottom plate 31 and light transmitting plates together with the rafters 11 enclose a chamber 49.

A radiant energy absorber 32 such as a sheet of infrared ray absorbing material is secured within the chamber 49 beneath the rafters 11 upon spaced upstanding supports 33 as best shown in FIG. 2. The supports 33 are coextensive with the rafters 11 and provided with openings 34, 35 in register with the openings 14, 14a, 14b, etc. of the rafters to permit air or gas to circulate through the system and to come into contact with the bottom surface 36 of the absorber 32. A rigid bottom member 37 is secured to the edges of the supports 33, and spaced from the absorber 32 to form an enclosed duct 40 within which the circulating air will be warmed. The bottom member 37 may also carry a solar light reflecting layer 38 upon its upper surface to reduce heat loss through said bottom member. Thermal insulating material 39 may also be placed beneath the bottom member 37 as shown in FIG. 2.

Elongated pins 41, similar in shape and function to pins 28 described above, may be used to hold the parts forming the duct 40 in place between the rafters 11. The thermal insulating material 39 is held in place by the bottom plate 31 which is secured to the rafters 11 by clips 42 extending through elongated slots 43, as best shown in FIG. 2a.

After the elements comprising each panel are placed between the rafters 11 as shown in FIG. 2, the gasket 24 is inflated by means of the tube 30 until a fluid tight seal is effected around the top of each panel. When all of the panels have been so assembled the system is ready for use. It will be noted that the entire solar panel array may be installed from within the building structure once the rafters 11 are properly apertured and in place.

In the event of panel failure such as a break in the transparent sheets 25, 26, a leak in the lines 18 or an accumulation of foreign matter on the outer transparent sheet 25 which might reduce panel efficiency, the affected panel may be quickly disassembled for repair from within the building as follows:

The gasket 24 is first deflated by means of the valve 30a. This action loosens the entire assembly.

The pin retaining screws 44 are loosened permitting the bottom plate 31 to be slide laterally far enough to release it from the next adjacent bottom plate. The thermal insulating material 39 will then drop out exposing the pins 41. When the pins 41 are removed the duct 40 is released and may be lowered from the rafters 11. Thereafter, the pins 28 are removed from the rafters 11 permitting the blocks 27 and their associated transparent sheets 25, 26, to be slid downwardly to free them from the rafters.

In FIG. 1a, the liquid bearing lines 18 have been shown as short loops. This construction permits the panel elements to be slipped free of the loops as they are tilted downwardly. Where a larger quantity of liquid is desired to be heated, the structure shown in FIG. 3 may be employed.

The liquid bearing lines 45 of FIG. 3 are in the form of elongated loops 46 which extend substantially the length of the duct 40. Each loop is connected at one end to a return header 6 and at its opposite end to an outlet header 47. In this manner, the circulating liquid entering each loop is heated while in the duct and thereafter added to the other heated liquid in the outlet header. Alternately, a single header can be used with the liquid getting progressively warmer as it passes through the panels. In either embodiment, a short length of flexible metal or plastic tubing 48 is secured between the header and the ends of the loops 46. The flexible tubing permits the free ends of the loops to be bent downwardly when the panel is being assembled or disassembled without damage to the connection between the tube ends and the header and without interference with the assembly or disassembly of the panel.

Referring to FIG. 5 there is shown another embodiment of the present invention in which the rafters 11 are provided with openings 50 at each end thereof. As in FIG. 1, the openings are cut along the center line of the rafters, since the center line is the region where tension passes to compression and therefore the cut doesn't appreciably weaken the rafter. In the FIG. 5 embodiment, however, the openings are cut in from the ends of the rafters and are graduated in size from a central entrance duct 51 to cause the gas or air to more uniformly pass through the panel array on its way to the outlet ducts 52, 53.

It will be seen from an examination of FIG. 5 that each rafter 11 has an opening at each end. The return air or gas is led into the space between two centrally disposed rafters through duct 51. The openings 50 in the rafters on each side of the duct 51 are the largest in a series which decrease with each successive rafter to the left and right of the central rafter pair. Conversely, the openings 50 at the opposite end of the central pair of rafters are relatively small and increases in size with each successive rafter to the left and right of the central rafter pair.

Air entering the space between the central rafter pair, indicated by the arrows 54, 54a, will follow a path whereby the larger volume will pass through the large openings 50 on each side of the inlet duct 51. The remaining air will flow along the rafters and move into the next rafter space through the small openings at the opposite end of the central rafter pair, this flow will continue until the air reaches the outlet ducts 52, 53 leading to the other elements in the solar heating system.

The panel elements shown in FIGS. 2-4 may be employed with the rafter structure of FIG. 5.

Figure 6:
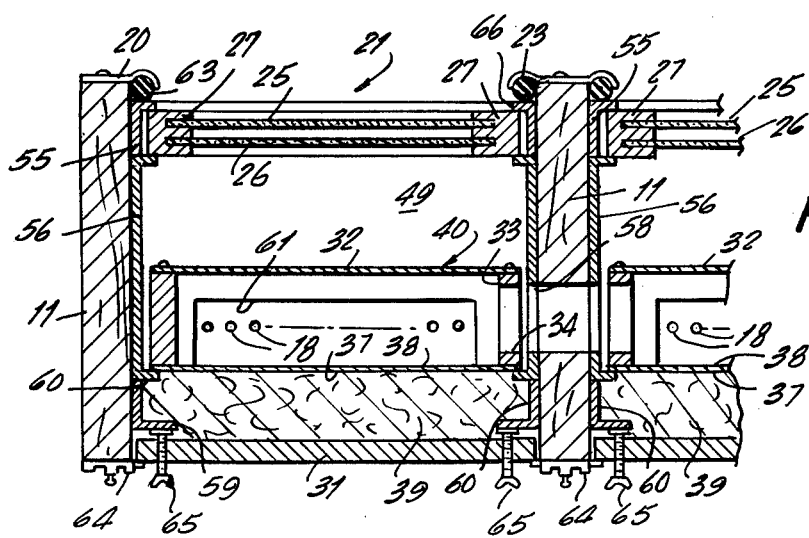
FIG. 6 is a cross sectional fragmentary view, similar to FIG. 2 but illustrating a further embodiment of the present inventor.
Figure 7:
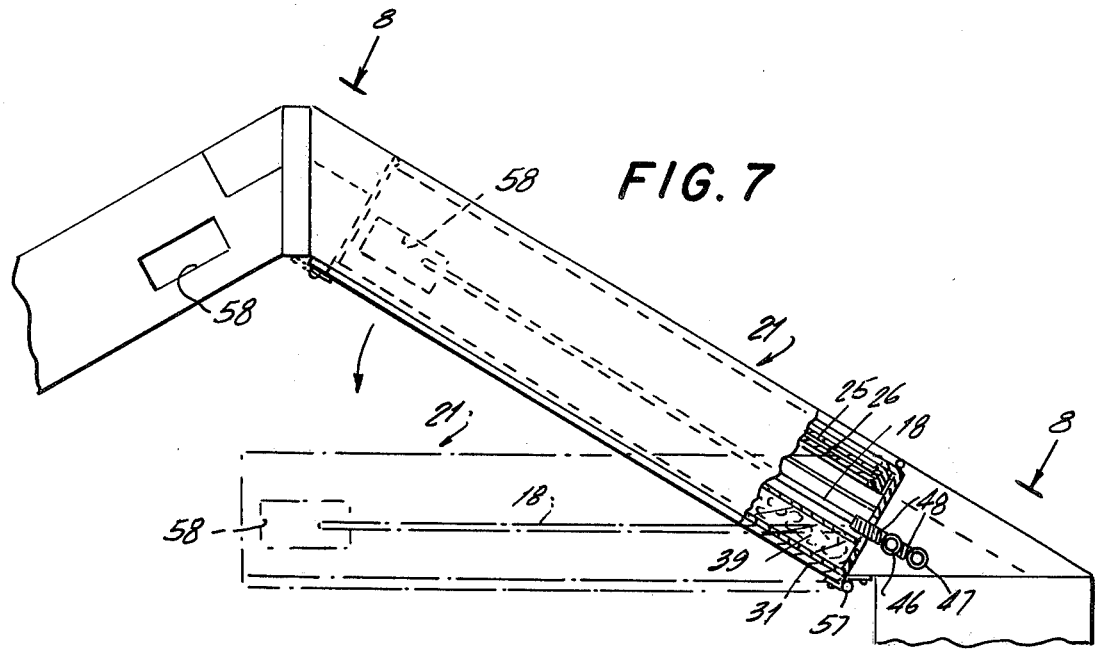
FIG. 7 is a view in side elevation partially broken away showing the manner in which a panel, made in accordance with the present invention can be lowered for maintenance.
Figure 8:
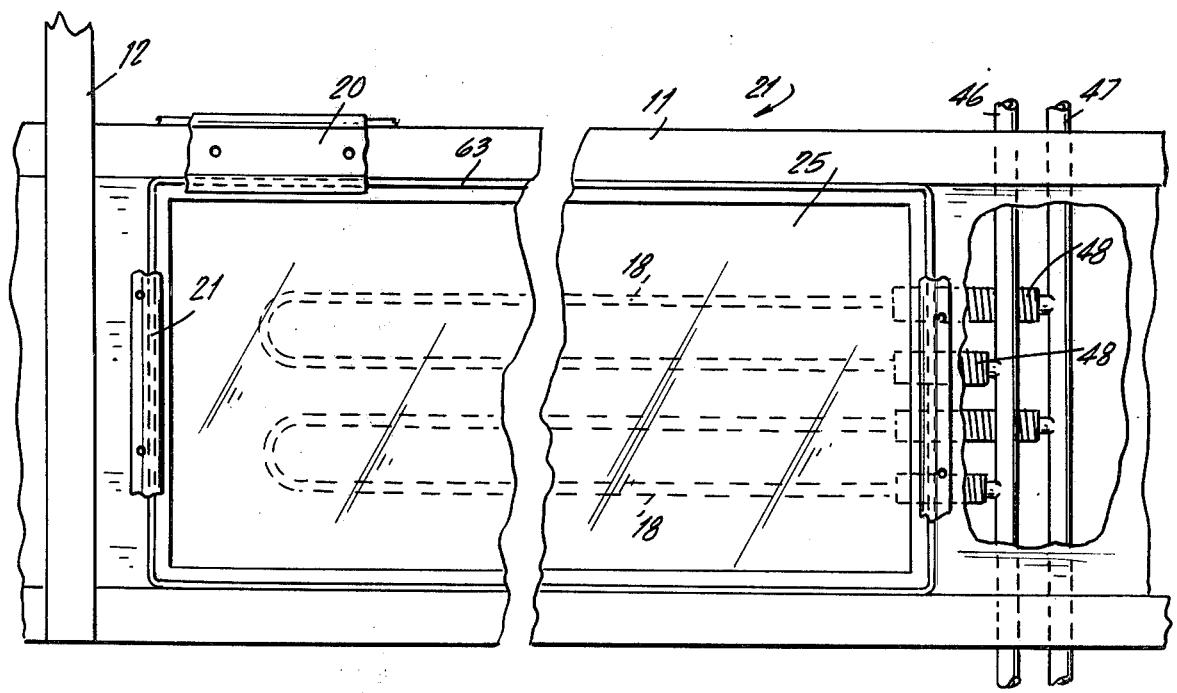
FIG. 8 is a fragmentary plan view taken on line 8—8 in FIG. 21, partly broken away.

In FIGS. 6, 7 and 8 there is shown still another solar panel assembly for installation within the rafters of a building. in accordance with the present invention. In this embodiment, the solar energy conversion elements are contained within a two part housing 55, 56, which is slipped between adjacent rafters 11. The housing 55, 56, has four sides and is open at its top and bottom. A hinge or other suitable member, indicated at 57 in FIG. 7 permits the housing to be swung from the operative position to the one shown in dashed lines for installation or servicing purposes.

The rafters 11 are provided with openings 14 or 50 as described above and the housing 56 is cut away at 58 to permit air to pass from one panel to another by way of the openings 34 in the upstanding supports 33. Instead of assembling the panel elements from the bottom as was the embodiment of FIGS. 1-4, this embodiment is assembled from the top as follows:

With the lower part 56 of the housing 55, 56 in the lowered or horizontal position, resting on the bottom plate 31, the thermal insulating material 39 is placed within the bottom of the housing between the housing bottom flanges 59 and the inwardly extending stop member 60. The rigid bottom member 37 and supports 33 secured thereto are next placed upon the stop member 60, overlying the insulating material 39. The copper tubing loops 18 may then be placed between the supports 33 and incorporated into the fluid circuit (of the circuit) of the system by means of headers, 46, 47 and flexible hoses 48 as shown in FIG. 8. An opening 61 may be provided in the housing to admit elongated loops of tubing 18 into the housing if necessary. To the top of the supports 33, there is then secured the radiant energy absorber 32.

The spaced light transmitting plates 25, 26 carried between resilient blocks 27 are next placed upon the top flanges 62 of the lower part 56 of the housing 55, 56. The upper part 55 of the housing 55, 56, is now slipped upon the top flange 62 and around the edges of the resilient blocks 27. A small top flange 66 on the top part 55 of housing 55, 56, overlies the blocks 27. A sealing gasket 63 is pressed into the concave recess 23 formed by the flanged strips 20 secured to the top of the rafters and will be held in place by frictional concact with said recess 23.

Figure 6A:
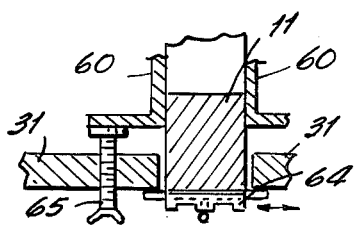
FIG. 6a is a detail view of the turn bolts for tightening the panels of FIG. 6.

The assembled panel may now be swung into the operative position shown in FIG. 7 and secured in place by slide bolts 64, best shown in FIG. 6. The slide bolts 64 are double ended and secured to the bottoms of the rafters 11. The bolts may be shifted to release one or both adjacent panels or to secure them in place as desired. With the panel in the position shown in FIG. 6, turn bolts 65 (see FIG. 6a) carried by the bottom plate 31 are tightened, forcing the housing 55, 56 into sealing contact with the gasket 63. The gasket 63 may be of the solid type shown in FIG. 6 or the pneumatic type of FIG. 2.

In order to disassemble the solar panel of FIGS. 6, 7 and 8 the housing 55, 56 is released by the latch bolts 64, loosened by the turn bolts 65 and swung into its horizontal position. The above steps are then carried out in reverse order.

Having thus fully described the invention, what is desired to be secured by Letters Patent is:

1. A solar energy conversion panel for use in a solar heating system incorporated into a building roof structure having a plurality of spaced rafters therein comprising at least one elongated light transmitting plate supported at its edges and disposed across and between adjacent rafters near the tops thereof, an elongated flanged strip disposed upon the rafters and overlying the edges of the light transmitting plate, an elastomeric gasket held by the flanged strip in fluid-tight contact with the edges of the said plate a bottom plate carried by the said adjacent rafters to enclose with the light transmitting plate and the rafters a chamber, an opening in each of the rafters adjacent at least one end thereof in communication with the chamber, an enclosed duct within the chamber, to receive a fluid, comprising an elongated rigid, bottom member, spaced upstanding supports on said bottom member and a solar energy absorber disposed across and carried by the upstanding supports, openings in the supports in register with the adjacent rafter openings and means to circulate the fluid in the chamber through the solar heating system.

2. Apparatus according to claim 1 in which the flanged strip is formed with a continuous concavity to receive the gasket therein.

3. Apparatus according to claim 1 in which the rafter openings are cut into the rafters from one end thereof.

4. Apparatus according to claim 1 in which the openings are of equal size and alternally located in the ends of successive rafters to form an elongated continuous flow path through the panels.

5. Apparatus according to claim 4 in which the rafter openings are of successively graduated sizes to equalize the flow of gases through the panels.

6. Apparatus according to claim 1 in which a hollow housing is swingably secured at one end to the rafters and carried between adjacent rafters.

7. Apparatus according to claim 1 in which the gasket is inflatable and an elongated tube is in communication with the gasket.

8. Apparatus according to claim 1 in which the fluid circulating means includes at least two valves and thermostatic means to drain the panel when ambient temperature drops below a predetermined level.

* * * * *